(12) United States Patent
Kugelev et al.

(10) Patent No.: US 6,978,799 B2
(45) Date of Patent: Dec. 27, 2005

(54) EMERGENCY PRESSURE RELIEF VALVE WITH ENHANCED RESET

(75) Inventors: Vladimir Kugelev, Arlington, TX (US); Mark D. Matzner, Burleson, TX (US)

(73) Assignee: S.P.M. Flow Control, Inc., Fort Worth, TX (US)

( * ) Notice: Subject to any disclaimer, the term of this patent is extended or adjusted under 35 U.S.C. 154(b) by 250 days.

(21) Appl. No.: 10/690,888

(22) Filed: Oct. 22, 2003

(65) Prior Publication Data

US 2005/0087232 A1  Apr. 28, 2005

(51) Int. Cl.$^7$ ............... F16K 17/02; F16K 31/122; F16K 21/10
(52) U.S. Cl. ............... 137/514.7; 137/528; 137/906; 251/54
(58) Field of Search ............... 137/514, 514.3, 137/514.5, 514.7, 528; 251/48, 54

(56) References Cited

U.S. PATENT DOCUMENTS

| | | |
|---|---|---|
| 1,379,092 A | 5/1921 | Fraccascia et al. |
| 1,889,256 A | 11/1932 | Lipscomb et al. |
| 2,361,881 A | 10/1944 | Sheppard |
| 2,506,162 A | 5/1950 | Metzgar |
| 3,789,872 A | 2/1974 | Elliott |
| 3,845,876 A | 11/1974 | Needham et al. |
| 3,881,480 A | 5/1975 | Lafourcade |
| 3,942,551 A | 3/1976 | Schuller et al. |
| 4,046,164 A | 9/1977 | Pool |
| 4,221,204 A | 9/1980 | Meyer |
| 4,274,434 A | 6/1981 | Hafele |
| 4,321,945 A | 3/1982 | Chabat-Courrede |
| 4,485,843 A | 12/1984 | Wolff |
| 4,531,542 A | 7/1985 | Looney |
| 4,716,930 A | 1/1988 | Richmond et al. |
| 5,441,072 A | 8/1995 | Indey et al. |
| 5,443,088 A | 8/1995 | Hoch et al. |
| 5,685,334 A | 11/1997 | Hagan |
| 5,787,926 A | 8/1998 | Mukumoto et al. |
| 6,209,561 B1 | 4/2001 | Kugelev et al. |

FOREIGN PATENT DOCUMENTS

GB          2355510 A   *   4/2001

OTHER PUBLICATIONS

Reset Relief Valves brochure; Harrisburg, Inc; 1982.
Retsco Inc.; Valve illustration; Aug. 1992.
An Introduction to Rupture Disk Technology catalog; BS&B; 1994.
Emergency Relief Valve brochure; SPM; Apr. 1997.
BJ 285959; Popoff Valve information; BJ Services; undated.

* cited by examiner

Primary Examiner—Ramesh Krishnamurthy
(74) Attorney, Agent, or Firm—Bracewell & Giuliani LLP

(57) ABSTRACT

A pressure relief valve has a housing fluidly connected to a pressurized system line carrying a system fluid. The housing carries a moveable piston and a valve member that both move between closed and open positions. The piston defines an upper chamber and a lower chamber within the housing. A pressurized fluid is supplied to the upper chamber to bias the piston toward the closed position. After the relief valve opens from excessive system pressure, the pressurized fluid is injected into the lower chamber to delay the return of the piston to the closed position. Initially, the fluid in the lower chamber flows through a check valve while the piston returns to the closed position. Then the fluid vent in the lower chamber vents from the lower chamber as the piston and valve member approach the closed position.

18 Claims, 4 Drawing Sheets

EMERGENCY PRESSURE RELIEF VALVE WITH ENHANCED RESET

BACKGROUND OF THE INVENTION

1. Field of the Invention

This invention relates in general to valves and in particular to an improved pressure relief valve that relieves a pressure of a system fluid by entering an open position and then by returning to the normally-closed position following a delay period.

2. Description of Related Art

In a fluid transport system having a system fluid with a pressure that varies, it is often desirable to relieve or lower the pressure of the system fluid if the pressure reaches an unacceptably high level. The most common way of relieving these high pressures is by use of a pressure relief valve. The pressure relief valve, which is in fluid communication with the system fluid, is designed to detect an unacceptable pressure level and relieve the pressure by opening the valve and allowing the system fluid to escape the system line.

A problem sometimes develops in the use of these valves in systems that experience rapidly varying pressures. For example, in certain oil and gas well treatments, high pressure liquid is pumped down the well to fracture the earth formation. Large high pressure reciprocating pumps at the surface pump the liquid through flow lines leading into the well. In these systems, the pressure in the system lines can become cyclical, with the pressure of the system fluid exceeding and dropping below an acceptable level.

A typical pressure relief valve for use in one of these systems includes a housing having an inlet port and an outlet port. The inlet port is connected to the system line. A valve member is located within the housing that is capable of moving between an open position and a closed position. In the open position, fluid communication is allowed between the inlet port and the outlet port. In the closed position, the valve member sealingly engages a portion of the housing, thereby preventing fluid communication between the inlet port and the outlet port. The valve member is biased such that it remains in the closed position when the pressure of the system fluid is at an acceptable level. As the pressure rises above an acceptable level, the valve member moves to the open position, thereby relieving the pressure by allowing the fluid to flow out of the outlet port of the valve.

A standard pressure relief valve includes a spring which provides a force to bias the valve member into the closed position. The size and type of spring is chosen based on the desired acceptable level of pressure of the system fluid. As the pressure of the system fluid rises above the acceptable level, the force exerted on the valve member by the fluid exceeds the force exerted by the spring, causing the valve member to move to an open position. As soon as the pressure of the system fluid returns to an acceptable level, the force exerted by the fluid becomes less than that exerted by the spring, and the valve member immediately returns to the closed position.

The spring may be mechanical or it may be a compressed gas chamber. A gas cushion spring includes a piston that is connected to one end of the valve member. The piston is disposed within a pressure chamber in the housing, and the piston and the valve member are adapted to move together from the open position to the closed position. A bias or control fluid, which is usually nitrogen gas, is introduced into the pressure chamber above the piston. The pressure of the control fluid exerts a biasing force on the piston, which pushes the piston and the valve member into the closed position. The valve member and piston move to the open position when the force exerted on the valve member by the system fluid exceeds the force exerted on the piston by the control fluid.

Both the mechanical spring and gas spring valves described above provide adequate ventilation of the system fluid when it reaches an unacceptably high pressure. However, both of these valves return immediately to the closed position when the pressure of the system fluid returns to an acceptable level. This method of operation is undesirable when the pressure of the system fluid varies rapidly. A rapid variation of the system fluid pressure causes these standard valves to "chatter," as they rapidly open and close. The rapid movement of the valve member within the housing causes excessive valve wear and excessive heat to be generated, both of which are undesirable features.

One solution to the "chatter" problem is currently employed in some pressure relief valves. These valves incorporate a manual reset feature that requires an operator to reset the valve once the valve has moved to an open position. Valves of this type typically use a valve member which is biased into the closed position by a mechanical spring. As the pressure of the system fluid rises to an unacceptable level, the valve member moves to an open position. Once it reaches the open position, the valve member is locked until an operator manually resets the valve, allowing the valve member to return the closed position. The problem with this type of valve is that it requires extensive operator monitoring and involvement when the pressure of the system fluid varies rapidly. Additionally, because the valve will not return to a closed position until manually reset, once the valve is opened the system fluid will be expelled from the valve even if the pressure returns to an acceptable level.

U.S. Pat. No. 6,209,561 solved the chatter problem by introducing a pressurized fluid, or delay fluid, beneath the piston to slow the return of the piston and valve member to the closed position. A one-way check valve extends through the piston from the lower portion to the upper portion of the pressure chamber. While returning to the closed position, the fluid in the lower chamber would flow through to the check valve to the upper chamber. While solving the "chatter" problem due to quick returns to the closed position, sometimes pressurized gas would remain in the lower portion of the pressure chamber and prevent the piston and check valve from fully returning to the closed position.

BRIEF SUMMARY OF THE INVENTION

The pressure relief valve according to the present invention solves the problems associated with the prior art. The pressure relief valve of the present invention includes a piston that is connected to one end of the valve member. The piston is disposed within a pressure chamber in the housing, the piston defining an upper chamber and a lower chamber within the pressure chamber. The piston and the valve member are adapted to move together from the open position to the closed position. Like the gas spring valve described above, the valve according to the present invention uses a control fluid such as nitrogen gas, which is introduced into the upper chamber. The pressure of the control fluid exerts a biasing force on the piston, which pushes the piston and the valve member into the closed position. The valve member and piston move to the open position when the force exerted on the valve member by the system fluid exceeds the force exerted on the piston by the control fluid.

The pressure relief valve according to the present invention uses a delay fluid to delay a return of the valve member from the open position to the closed position. As the valve is exposed to a system fluid with an unacceptably high pressure, the valve moves from the closed position to the open position. Between the closed and open positions is an intermediate position, at which point a control fluid is introduced into the chamber beneath the piston. A fluid injector stab injects pressurized fluid into the portion of the chamber beneath the piston after the valve moves from the closed position to the open position. The pressure of the control fluid beneath the piston provides a delay force to the piston which is opposite in direction to the biasing force provided by the control fluid above the piston. As the pressure of the system fluid returns to an acceptable level, the fluid beneath the piston acts against the piston to delay the return of the piston to the closed position.

As the piston and valve member initially return to the closed position, the fluid flows from the portion of the chamber below the piston. Preferably, the fluid beneath the piston travels from below the piston into the chamber above the piston by way of a check valve carried by the piston. As the piston and valve member continue to return to the closed position, the fluid below the piston is exposed to a port that allows the fluid to vent from the area below the piston. Venting the fluid helps the piston and valve member fully return or land in a valve seat of the pressure relief valve.

DETAILED DESCRIPTION OF THE PREFERRED EMBODIMENT

Figure 1:
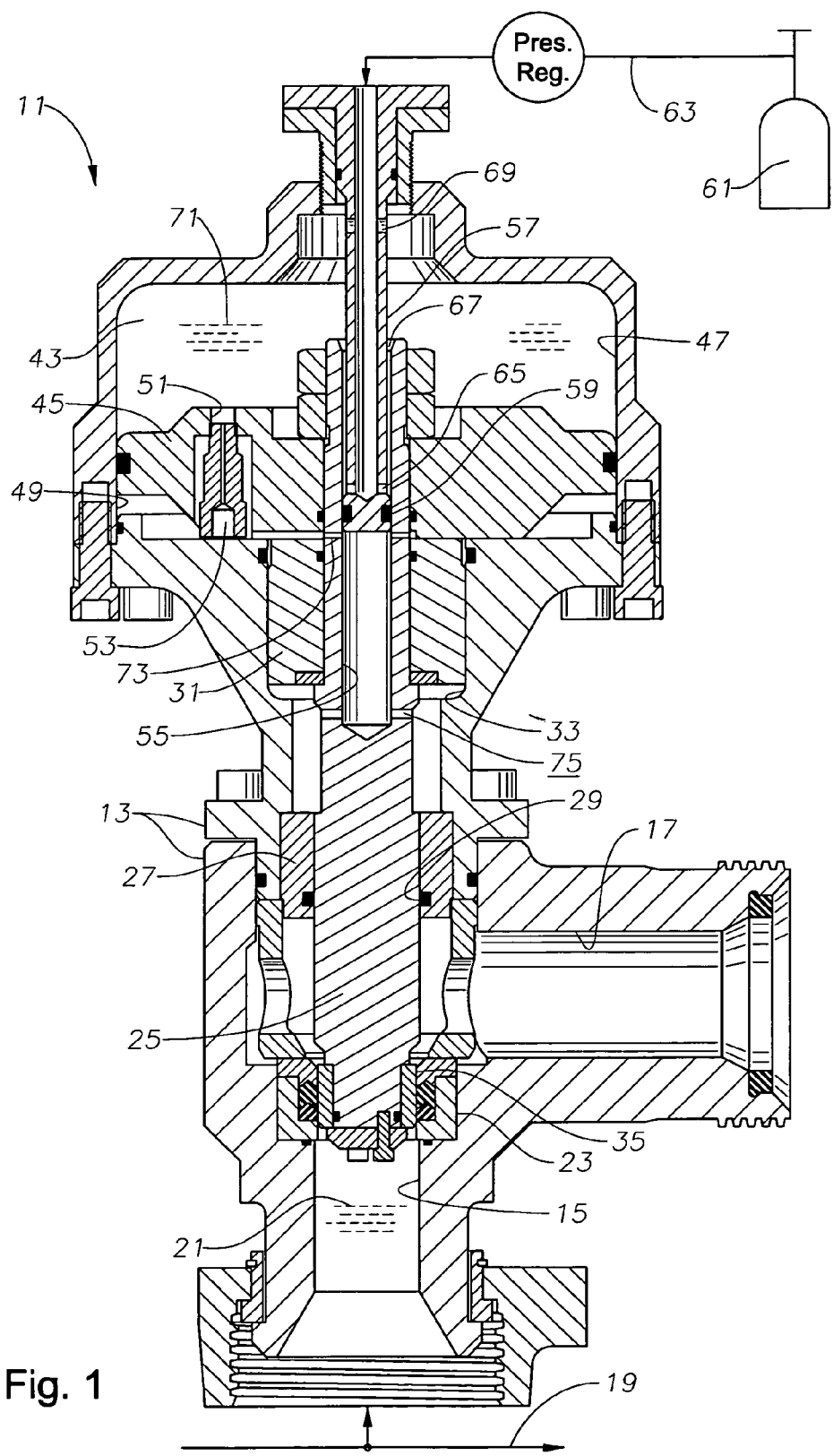
FIG. 1 is a cross-sectional view of a valve according to the present invention, the valve being shown in a closed position.

Referring to FIG. 1–4 in the drawings, the preferred embodiment of a pressure relief valve 11 according to the present invention is illustrated. Valve 11 includes a housing 13 having a wall and a relief passage with an inlet 15 and an outlet 17. Inlet 15 is situated such that its longitudinal axis intersects and forms a right angle to the longitudinal axis of outlet 17. A system line 19 is fluidly connected to inlet 15, system line 19 carrying a system fluid 21 which is introduced to valve 11 through inlet 15. A valve seat 23 is disposed within housing 13 between inlet 15 and outlet 17.

A valve member 25 having an upper end and a lower end is slidingly disposed within housing 13 so that the longitudinal axis of valve member 25 is coaxial to the axis of inlet 15. Valve member 25 passes through a partition 27. A seal 29 provides a sealing engagement between partition 27 and valve member 25. Toward its upper end, valve member 25 is engaged by a guide 31 which is disposed within a counterbore 33. Guide 31 is used to control the translational movement of valve member 25 within housing 13 so that it moves in a direction parallel to the longitudinal axis of valve member 25. A sealing area 35 is located at the lower end of valve member 25.

Figure 4:
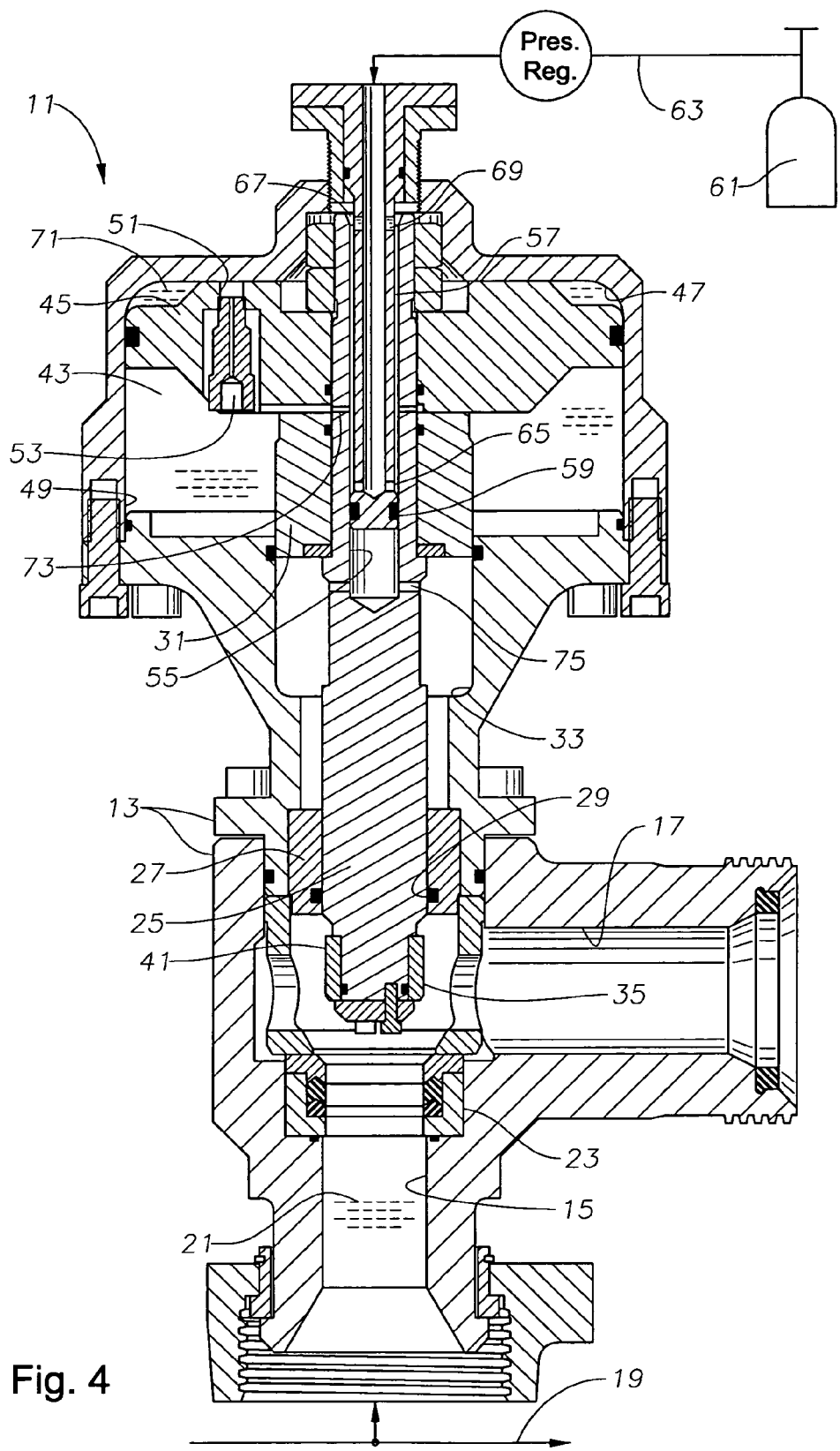
FIG. 4 is a cross-sectional view of the valve of FIG. 1, the valve being shown in an open position.

Valve member 25 is adapted to move within housing 13 between a closed position shown in FIG. 1 and an open position shown in FIG. 4. In the closed position, sealing area 35 fully engages valve seat 23 to block flow of system fluid 21 through the relief passage. In the open position, sealing area 35 no longer engages valve seat 23, thereby allowing flow of system fluid 21 through the relief passage.

Figure 2:
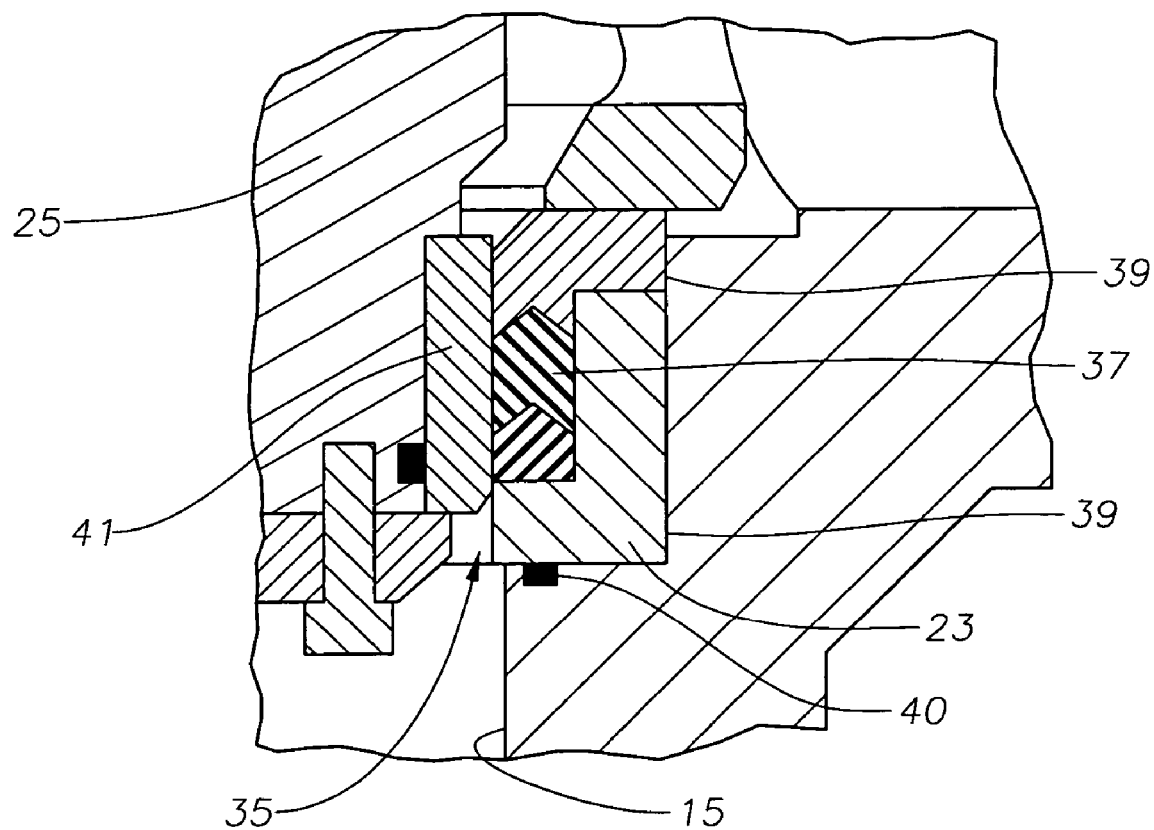
FIG. 2 is an enlarged view of a portion of the valve of FIG. 1, showing a seating area of the valve of FIG. 1.

Referring now to FIG. 2 in the drawings, the components associated with valve seat 23 and sealing area 35 are illustrated. The components of valve seat 23 work cooperatively with the components of sealing area 35 to block flow of system fluid 21 through the relief passage when valve member 25 is in the closed position. Valve seat 23 includes a seal 37 secured by an upper and a lower retainer 39. Retainers 39 sealingly engage an interior wall of housing 13 to prevent leakage of system fluid 21 when valve member 25 is in the closed position.

The primary component associated with sealing area 35 is a bushing 41 which is releasably connected to valve member 25. Bushing 41 is sealingly disposed in a circumferential depression milled in the lower end of valve member 25. Bushing 41 forms a sealing engagement with seal 37 when valve member 25 is in the closed position. The sealing engagement between seal 37 and bushing 41 provides the primary method of sealing the relief passage when valve member 25 is in the closed position.

Referring again to FIGS. 1, 3, and 4, a pressure chamber 43 is formed within housing 13, the pressure chamber being annular in shape with an inner annular surface. A pressure barrier or piston 45 is connected to the upper end of valve member 25. Piston 45 is annular in shape and has an upper, or first side and a lower, or second side. Piston 45 sealingly and slidingly engages the inner annular surface of pressure chamber 43. Piston 45 moves within chamber 43 in conjunction with valve member 25 between the open and closed positions.

Piston 45 divides pressure chamber 43 into an upper portion 47 and a lower portion 49. A delay passage 51 extends through piston 45 and carries a check valve 53. Together, delay passage 51 and check valve 53 make up a delay fluid outlet port, providing unidirectional fluid communication between lower portion 49 below piston 45 and upper portion 47 above piston 45. In the preferred embodiment, fluid communication through check valve 53 is possible only when fluid flow is from lower portion 49 to upper portion 47. Check valve 53 prevents fluid flow from upper portion 47 to lower portion 49.

Figure 3:
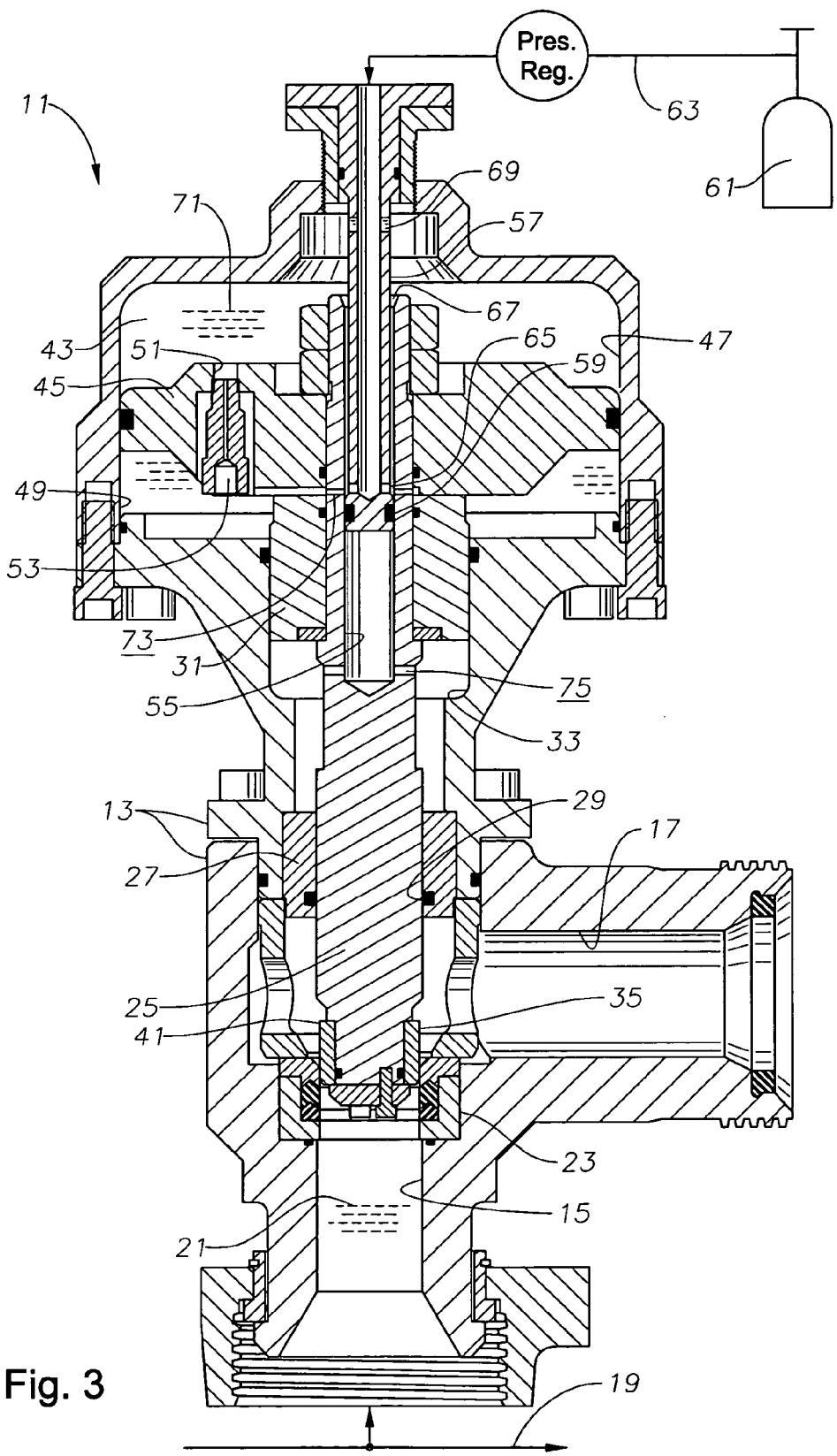
FIG. 3 is a cross-sectional view of the valve of FIG. 1, the valve being shown in an intermediate position.

Referring to FIGS. 1, 3, and 4, an axial bore 55 is formed in an upper portion of valve member 25. A fluid injector stab 57 extends through a side of pressure chamber 43 and stabs into bore 55. Fluid injector stab 57 remains stationary when piston 45 and valve member 25 move between the open and closed positions. A seal 59 located toward the end of injector stab extending into bore 55 sealingly engages the interior surface of valve member 25. Fluid injector stab 57 is preferably tubular, and is connected to a pressurized fluid source 61 through a fluid line 63. In the preferred embodiment, a lower stab port 65 is located adjacent seal 59, and extends from the interior of tubular injector stab 57 to an annulus 67 defined by bore 55 and injector stab 57. Annulus 67 extends away from seal 59 to upper portion 47 of pressure chamber 43. An upper stab port 69 located on a portion of injector stab 57 that is not received within bore 55 extends through a sidewall of injector stab 57 into upper portion 47 of pressure chamber 43. A control fluid 71, preferably nitrogen gas, communicates from fluid source 61, through fluid line 63 and the interior of injector stab 57 to ports 65, 69. When valve member 25 and piston 45 are in the closed position, as shown in FIG. 1, both ports 65, 69 transmit control fluid 71 into upper portion 47.

A valve member port 73 extends from bore 55 through a sidewall of valve member 25. In the preferred embodiment, valve member port 73 is positioned so that seal 59 sealingly engages bore 55 between valve member port 73 and lower stab port 65 when piston 45 and valve member 25 are in the closed or lower position. Valve member port 73 is in fluid communication with lower portion 49 of pressure chamber 43. Valve member port 73 moves relative to seal 59 and lower stab port 65 when piston 45 and valve member 25 are in the intermediate position (FIG. 3) or the open position (FIG. 4). In both the intermediate and open positions, lower stab port 65 is in fluid communication with valve member port 73, thereby allowing fluid source 61 to transmit control fluid 71 into lower portion 49 of pressure chamber 43. Control fluid 71 continues to communicate from fluid source 61 to upper portion 47 of pressure chamber through upper stab port 69.

A venting port 75 extends from bore 55 through a sidewall of valve member 25. Venting port 75 transmits control fluid 71 within bore 55 below seal 59 to either atmosphere or to a control fluid collection assembly (not shown). Venting port 75 does not communicate with lower portion 49 of pressure chamber when valve member port 73 is above seal 59, as shown in FIGS. 3 and 4 of the intermediate and open positions. Therefore, seal 59 helps to prevent control fluid 71 from exiting lower portion 49 of pressure chamber 43 while valve member port 73 is above seal 59. Control fluid 71 flows through check valve 53 of piston 45 and valve member 25 moves from the open position shown in FIG. 4 to the intermediate position shown in FIG. 3 while valve member port 73 is substantially at or above seal 59, thereby delaying the return of piston 45 and valve member 25 to the closed position shown in FIG. 1. Control fluid 71 vents through valve chamber port 73 and venting port 75 when valve chamber port 73 is below seal 59, thereby allowing the full return to the closed position. Control fluid 71 typically vents from lower portion 49 of pressure chamber 43 while piston 45 and valve member 25 are returning to the closed position shown in FIG. 1.

The upper side of piston 45 has a pressure area proportional to the squared value of the diameter of pressure chamber 43. The lower side of piston 45 has a pressure area proportional to the squared value of the diameter of chamber 43 minus the diameter of guide 31. The result is that the upper pressure area of piston 45 is greater than the lower pressure area. If the pressure on both upper and lower sides of piston 45 is the same, the net pressure force is downward. The significance of the difference in the pressure areas is explained below in relation to the operation of valve 11.

Referring now primarily to FIGS. 1, 3, and 4, the operation of valve 11 is illustrated. Relief passage inlet 15 is connected to system line 19 to regulate the pressure of system fluid 21. During a low pressure operation, when the pressure of system fluid 21 is below or at an acceptable level, valve member 25 remains in the closed position (see FIG. 1). During a high pressure operation, when the pressure of system fluid 21 is above the acceptable level, valve member 25 moves to the open position (see FIG. 4). In the open position, system fluid 21 is allowed to flow through the relief passage, exiting the valve through outlet 17.

In the preferred embodiment, the acceptable level of pressure of system fluid 21 is determined and set by the pressure of control fluid 71. During normal operations, when in the closed position of FIG. 1, control fluid is introduced into upper portion 47 of pressure chamber 43 through stab ports 65, 69 on injector stab 57. Control fluid flows directly into upper portion 47 from stab port 69. Control fluid communicates through annulus 67, above seal 59, from stab port 65. The presence of pressurized control fluid 71 in upper portion 47 causes a biasing force to be exerted on the upper side of piston 45. The biasing force pushes piston 45 and valve member 25 toward into the closed position (see FIG. 1). Piston 45 and valve member 25 remain in the closed position while system fluid 21 is below the maximum pressure level. When the pressure of system fluid 21 exceeds the acceptable level, the force exerted by system fluid 21 on the lower end of valve member 25 exceeds the biasing force exerted on the upper side of piston 45, thereby causing valve member 25 and piston 45 to move into the open position (see FIG. 4). Valve member 25 will stay in the open position during high pressure operation of valve 11. System fluid 21 flows through relief passage outlet 17.

As the pressure of system fluid 21 exceeds the predetermined level necessary to overcome the biasing force due to control fluid 71 in upper portion 47 of chamber 43, piston 45 and valve member 25 move through the intermediate position shown in FIG. 3 to the open position shown in FIG. 4. Stab port 65 begins injecting control fluid 71 into lower portion 49 of pressure chamber 43 after valve member port 73 moves passed seal 59. Control fluid 71 applies the same pressure on both sides of piston 45. Therefore, control fluid 71 in lower portion 49 of chamber 43 creates a force on the lower side of piston 45 that delays a quick return of piston 45 and valve member 25 to the closed position shown in FIG. 1.

As mentioned above, because the surface area of the upper side of piston 45 is larger than the surface area of the lower side of piston 45, the biasing force from control fluid 71 in upper portion 47 is larger than the delay force from control fluid in lower chamber 49 even though the pressure is the same. Therefore, piston 45 and valve member 25 begin returning to the closed position of FIG. 1 when the pressure of system fluid 21 returns to below the predetermined level. Control fluid 71 passes through check valve 53 from lower portion 49 to upper portion 47 of pressure chamber 43 while valve member port 73 is on the same side of seal 59 as stab port 65. After valve member 25 returns toward the closed position far enough for valve member port 73 to be on the opposite side of seal 59 from stab port 65, control fluid 71 vents from lower portion 49 into bore 55 and through venting port 75.

Venting the gas from lower portion 47 of chamber 43 advantageously discontinues the delay forces experienced by piston 45. The biasing force on the upper side of piston 45 can more easily force piston 45 and valve member 25 to return fully, or land completely in valve seat 23, after the pressure of system fluid 21 returns to below the predetermined value. The problem involving chattering is still reduced because control fluid 71 prevents valve member 25 from rapidly closing after each opening while valve member port 73 is above seal 59 and transmitting control fluid 71 into lower portion 49.

It should be apparent from the foregoing that an invention having significant advantages has been provided. While the invention is shown in only one of its forms, it is not just limited but is susceptible to various changes and modifications without departing from the spirit thereof.

What is claimed is:

1. An improved pressure relief valve having a housing with a relief passage, a valve seat therein, and a pressure chamber, a movable valve member in the housing that is movable from a closed position to an open position in response to a system pressure increase, a movable pressure barrier carried in the pressure chamber and operably connected to the valve member, wherein the improvement comprises:
- a stationary fluid injector stab extending through a side of the pressure chamber and sealingly engaging a central bore of the movable valve member for delivering pressurized fluid;
- a stab port extending through a sidewall of the injector stab for flowing the fluid into the pressure chamber on a first side of the pressure barrier; and
- a valve member port extending through a side of the valve member, the valve member port being in fluid communication with the stab port when the valve member is in its open position so that the pressurized fluid flows into the pressure chamber on a second side of the pressure barrier, the valve member port being sealed from the stab port when the valve member is in its closed position and venting while the valve member is approaching its closed position for the fluid on the second side of the pressure barrier to exit the chamber.

2. The improved pressure relief valve of claim 1, wherein the stab port comprises:
- a first stab port located adjacent the portion of the injector stab that sealingly engages the central bore of the valve member; and
- a second stab port spaced axially from the first stab port relative to an axis of the injector stab.

3. The improved pressure relief valve of claim 2, wherein the first stab port transmits the pressurized fluid to the pressure chamber on the second side of the pressure barrier after the valve member moves from the closed position.

4. The improved pressure relief valve of claim 2, wherein the second stab port always communicates with the pressure chamber on the first side of the pressure barrier.

5. The improved pressure relief valve of claim 2, wherein the first stab port communicates with the pressure chamber on the first side of the pressure barrier when valve member is in the closed position.

6. The improved pressure relief valve of claim 1, further comprising a venting port through a side wall of the valve member, the venting port being sealed from the pressure chamber on the second side of the pressure barrier when the valve member is in the open position, and being in fluid communication with the pressure chamber on the second side of the pressure barrier as the valve member is approaches the closed position.

7. The improved pressure relief valve of claim 1, further comprising a barrier outlet port associated with the pressure chamber on the second side of the pressure barrier for transmitting the pressurized fluid from the pressure chamber on the second side of the pressure barrier to the pressure chamber on the first side of the pressure barrier when the valve member and pressure barrier begin moving from the open position to the closed position.

8. The improved pressure relief valve of claim 1, further comprising a seal located adjacent the stab port, the seal engages the bore of the valve member between the stab port and the valve member port and thereby preventing the pressurized fluid from entering the pressure chamber on the second side of the pressure barrier when the valve member is in the closed position.

9. The improved pressure relief valve of claim 1, further comprising a venting port through a side wall of the valve member for venting the pressurized fluid flowing through the valve member port to atmosphere when the valve member is approaching its closed position.

10. An improved pressure relief valve, comprising:
- a housing with a relief passage, a valve seat therein, and a pressure chamber;
- a movable valve member in the housing, which is movable from a closed position to an open position, the valve member engaging the valve seat in the closed position to block flow through the relief passage, the valve member moving away from the valve seat in the open position to allow flow through the relief passage while the pressure in the system is sufficiently high;
- a movable pressure barrier carried in the pressure chamber, defining first and second sides of the pressure chamber, and operably connected to the valve member for movement therewith;
- a fluid injector stab stationarily extending through the first side of the pressure chamber and having a seal sealingly engaging a central bore of the movable valve member;
- a stab port extending through a side wall of the injector stab on a first side of the seal to communicate pressurized fluid into the first side of the chamber when the valve member is in the closed position;
- a valve member port extending from the central bore to the second side of pressure chamber to supply pressurized fluid from the stab port to the second side of the pressure chamber when the valve member moves the valve member port above the seal; and
- a vent port in the valve member that extends from the central bore to atmosphere for venting pressurized fluid for the second side of the pressure chamber when the valve member moves the valve member port below the seal.

11. The improved pressure relief valve of claim 10, further comprising a second stab port spaced above the first mentioned stab port for continuous communication with the first side of the pressure chamber.

12. The improved pressure relief valve of claim 10, wherein the fluid injector stab extends from an upper side of the pressure chamber toward the valve member.

13. The improved pressure relief valve of claim 10, further comprising an annular space between the central bore and the stab above the seal.

14. The improved pressure relief valve of claim 10, wherein the valve member port is continuously in communication with the second side of the pressure chamber.

15. A method of relieving a pressure of a system fluid in a pressurized system line having a valve having a housing with a relief passage, a valve seat, and a pressure chamber therein, the method comprising the steps of:
- (a) disposing a movable valve member within the housing, and stationarily mounting an injector stab within a tubular portion of the valve member;
- (b) operably connecting the valve member to a pressure barrier disposed in the pressure chamber;
- (c) injecting a pressurized fluid through the injector stab into the pressure chamber on a first side of the pressure barrier, thereby creating a biasing force against the first side of the pressure barrier, urging the valve member to the closed position;
- (d) exposing the valve member to the system fluid and applying system fluid pressure to open the valve member when the pressure of the system fluid is sufficiently high to overcome the pressure of the fluid in the pressure chamber on the first side of the pressure barrier, allowing flow through the relief passage; then
- (e) injecting the pressurized fluid through the injector stab into the pressure chamber on a second side of the pressure barrier while the valve member is in the open position to delay a return of the valve member back to the closed position; then (f) venting the pressurized fluid from the second side of the pressure barrier as the valve member returns to the closed position.

16. The method of claim 15, wherein step (c) occurs continuously, regardless of the position of the valve member.

17. The method of claim 15, wherein step (e) occurs in response to movement of the valve member from the closed position.

18. The method of claim 15, wherein step (f) occurs in response to movement of the valve member from the open position toward the closed position.

* * * * *